United States Patent
Yao et al.

(10) Patent No.: US 6,885,922 B2
(45) Date of Patent: Apr. 26, 2005

(54) SYSTEM AND METHOD OF ROBUST FAULT DETECTION FOR A VEHICLE STEER-BY-WIRE SYSTEM

(75) Inventors: Yixin Yao, Ann Arbor, MI (US); Deanna Carroll, Ann Arbor, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 0 days.

(21) Appl. No.: 10/602,958

(22) Filed: Jun. 24, 2003

(65) Prior Publication Data

US 2004/0267424 A1 Dec. 30, 2004

(51) Int. Cl.[7] .............................................. G06F 19/00
(52) U.S. Cl. ............................. 701/29; 701/34; 701/41
(58) Field of Search .............................. 701/34, 29, 43; 180/402, 405, 446

(56) References Cited

U.S. PATENT DOCUMENTS

| | | |
|---|---|---|
| 5,615,119 A | 3/1997 | Vos |
| 5,819,188 A | 10/1998 | Vos |
| 5,925,083 A | 7/1999 | Ackermann |
| 6,085,127 A | 7/2000 | Vos |
| 6,208,923 B1 | 3/2001 | Hommel |
| 6,279,674 B1 | 8/2001 | Lissel et al. |
| 2001/0027893 A1 | 10/2001 | Nishizaki et al. |
| 2001/0029408 A1 | 10/2001 | Murray et al. |
| 2002/0019690 A1 | 2/2002 | Kurishige et al. |
| 2002/0026268 A1 | 2/2002 | Millsap et al. |
| 2003/0114969 A1 * | 6/2003 | Dominke et al. .............. 701/41 |
| 2003/0230448 A1 * | 12/2003 | Guldner et al. ............. 180/402 |

* cited by examiner

Primary Examiner—Thomas G. Black
Assistant Examiner—Christine M. Behncke
(74) Attorney, Agent, or Firm—Brinks Hofer Gilson & Lione

(57) ABSTRACT

The present invention involves a system and method of model-based fault detection for a vehicle steer-by-wire system. The method includes providing a steer-by-wire fault detection unit to implement fault detection for the fault occurrence in sensors, actuators, and the controlled plant. The steer-by-wire fault detection unit is composed of a residual generator and decision-making unit. The residual generator generates a series of residual signal which are difference between the estimation signals based on a steer-by-wire controlled plant mathematical model and the actual measurement signals of steer-by-wire controlled plant. The decision making unit determines whether any faults have occurred by applying a fault test rule for residual signals. The fault detection for the steer-by-wire system includes the influence of system uncertainty and nonlinearity, A robust gain scheduling $H^\infty$ fault detector is implemented to generate residual signals to reduce the effect of system uncertainty and nonlinearity for the residual signals. Therefore, the fault detection system is robust with respect to the model uncertainty, external noise and dynamic gain change, and is sensitive to faults occurrence in the steer-by-wire controlled plant.

21 Claims, 3 Drawing Sheets

SYSTEM AND METHOD OF ROBUST FAULT DETECTION FOR A VEHICLE STEER-BY-WIRE SYSTEM

BACKGROUND OF THE INVENTION

The present invention relates generally to a fault detection system and method for steer-by-wire systems and more particularly relates to robust model-based fault detection system and method for steer-by-wire systems.

Steer-by-wire systems replace the mechanical linkage between a steering wheel and road wheels of a vehicle with electrical connections based on electrical actuation system including electric motor actuators, motor drivers, sensors, microprocessors, and other electrical and mechanical components. This allows the vehicle road wheels and steering wheel to be controlled by using electrical signals based on the electrical actuation motion system.

Due to the criticality of steering functionality, it is important for steer-by-wire system to provide fault detection function such that safe operation of vehicle can be maintained for possible faults which may occur in any component of a steer-by-wire system including sensors, actuators, and other electro-mechanical components. For instance, the fault should be detected and isolated to maintain the nominal direction control for the vehicle when a bias of the road wheel angle sensor occurs during normal operation of the steer-by-wire system.

Redundancy is needed to detect faults of systems and components. Redundancy is used to make consistency checks between related variables. A common redundancy for some components is hardware redundancy by using extra hardware. For example, a sensor is duplicated or triplicated and fault decision can be made to compare signal levels of sensors. For safe operation of the steer-by-wire control system, hardware redundancy being reliable and high performance for critical components should be implemented. However, redundancy is limited by weight, package, extra cost, space, consuming, and similar installation environment for the hardware.

BRIEF SUMMARY OF THE INVENTION

Instead of hardware redundancy, analytical redundancy can be applied in the steer-by-wire system to replace extra hardware based on the mathematical relationships between the controlled system variables. Model-based fault detection utilizes analytical redundancy, rather than traditional physical extra hardware, providing reduced cost and increased reliability. Analytical redundancy solutions may be better able to meet the automotive industry's need for low cost and lightweight applications. Thus, it offers many benefits as a valuable technique for fault detection in safety critical steer-by-wire systems.

It is an aspect of the present invention to provide analytical redundancy technology for a vehicle steer-by-wire system. The model-based fault detection according to analytical redundancy technology detects fault occurrence in sensors, actuators, and the steer-by-wire controlled plant with electro-mechanical components.

In this embodiment, the analytical redundancy technology detects faults by utilizing the inherent dynamic relationships between inputs and outputs of a steer-by-wire system. The model-based fault detection in the framework of analytical redundancy uses a mathematical model of the steer-by-wire system, and implements a consistency check between the model variables and observed variables of the actual steer-by-wire system to infer if fault occurs and which components fail. This task is implemented by using a residual signal generator to derive a series residual signal. Faults may then be detected if the residual signal exceeds a given threshold when faults occur in the sensors, actuators, and controlled steer-by-wire system.

In this embodiment, the present invention includes a system and method to provide a model-based fault detection using a residual signal generator for a vehicle steer-by-wire system. The fault detection system receives the sensed road wheel angles, steering wheel angle signals, controller command signals, vehicle speed signals and other vehicle signals. Signals are processed by the residual generator based on knowledge of the normal behavior of the system to generate residual signals. Residual signals are examined for the likelihood of faults, and a decision rule is then applied to determine if any faults have occurred.

In this embodiment, a series residuals may be generated which each residual indicates a different fault to achieve fault isolation.

It is another aspect of the present invention to provide a robust model-based fault detection system for a vehicle steer-by-wire system under the influence of system uncertainty and nonlinearity.

In this embodiment, steer-by-wire system dynamics change with road conditions, vehicle loads, road-tire friction, electric motor-based actuator and assembly dynamics, vehicle dynamics and external circumstances. Notably, system gain changes with vehicle speed. The steer-by-wire system is a nonlinear system with severe uncertainties. The modeling errors are also an important issue to cause uncertainty of model-based fault detection. The uncertainty and nonlinearity of the steer-by-wire system are the main sources of inaccuracy in the steer-by-wire model. In this embodiment, model-based fault detection methods rely on a mathematical model of the steer-by-wire system to produce redundant information for fault detection. Thus, these uncertainties and nonlinear characteristics in steer-by-wire control systems increase the difficulty of fault detection resulting in increased false alarm rates and detection delays.

In this embodiment, the present invention provides an effective and reliable fault detection system which is robust with respect to model uncertainty and sensitive to faults. It is considered as a robust fault detection system because of its robust-sensitivity property. The model-based fault detection used in a steer-by-wire system takes into consideration model uncertainties and non-linear characteristics in order to avoid excessive false alarms.

It is another aspect of the present invention to provide a method of implementing a robust model-based steer-by-wire fault detection. To overcome the effects of model uncertainties and non-linear characteristics, a robust fault detection method using the proposed robust gain scheduling $H^\infty$ fault detector is introduced to detect fault occurrence in sensors, actuators and the controlled steer-by-wire plant itself. The $H^\infty$ estimation strategy in this robust fault detection method considers the system uncertainties, disturbances and noise signals which are not completely known for the steer-by-wire systems. Thus, the effect of uncertainties on fault detection is reduced and robustness with respect to model uncertainty is improved. A gain scheduling strategy in this robust fault detection method may detect fault occurrence in systems whose dynamics change with operating conditions enabling nonlinear fault detection for the steer-by-wire system.

In carrying out the above aspects of the present invention, one embodiment provides a steer-by-wire model-based fault detector based on an uncertain system model and the relationship between the plant dynamics and operating conditions. The robust gain scheduling H∞ fault detector takes into consideration the effect of uncertainties and nonlinearities in the steer-by-wire system to describe the various types of fault occurrence in the sensors, actuators and steer-by-wire controlled plant.

Other aspects and advantages of the present invention will become apparent upon reading the following detailed description and appended claims, and upon reference to the accompanying drawings.

DETAILED DESCRIPTION OF THE INVENTION

Figure 1:
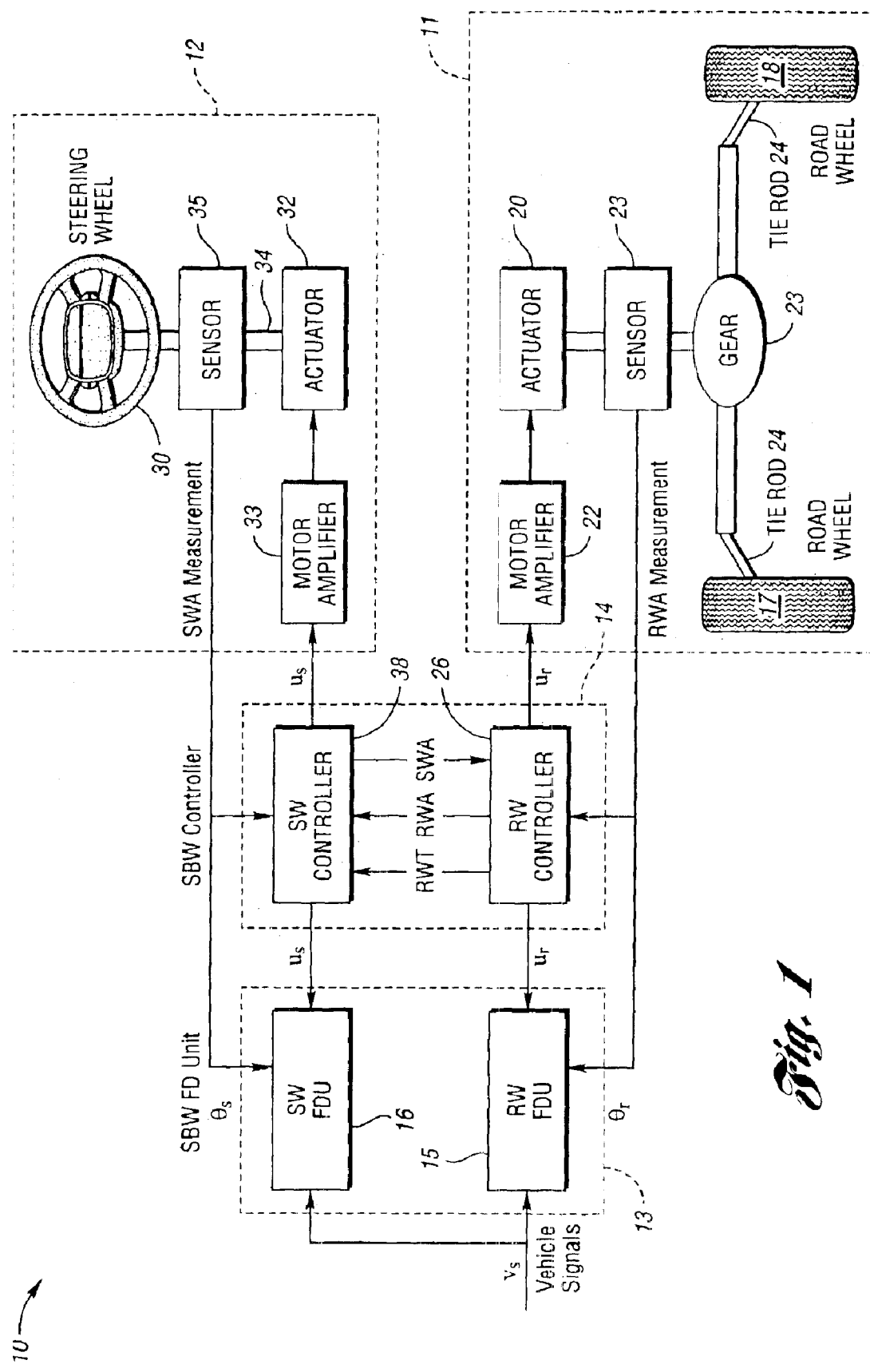
FIG. 1 is a schematic diagram of the steer-by-wire system with the model-based fault detection unit (FDU) in accordance with one embodiment of the present invention.

FIG. 1 illustrates a schematic diagram of the steer-by-wire system 10 with a model-based fault detection unit in accordance with one embodiment of the present invention. The steer-by-wire system 10 is comprised of road wheel actuation system 11 and steering wheel force feedback system 12. The steer-by-wire system 10 further includes as steer-by-wire fault detection unit 13 and a steer-by-wire controller unit 14 both in electrical communication with systems 11 and 12 for fault detection, respectively. The fault detection unit 13 includes a road wheel fault detection unit 15 and a steering wheel fault detection unit 16 in electrical communication with the unit 15. The steer-by-wire controller unit 14 includes road wheel controller 26 and steering wheel controller 38 in electrical communication with controller 26.

The road wheel actuation system 11 includes road wheel fault detection unit 15 and road wheel controller 26 in electrical communication with the road wheel fault detection unit 15. The road wheel actuation system 11 further includes road wheels 17 and 18, a road wheel motor actuator 20 and its amplifier 22 in communication with controller 26, a sensor 23 measuring road wheel angle, and an actuator mechanism 24 to connect the actuator and two road wheels. The reference input to the road wheel actuation feedback controller 26 comes from a steering wheel angle (SWA) signal in the steering wheel force feedback system 12. The road wheel angle (RWA) and road wheel torque (RWT) signals of the road wheel actuation feedback controller 26 are fed to the steering wheel force feedback system 12.

The steering wheel force feedback system 12 is a motor actuator-based control system which provides a reference input angle to the road wheel system 11 and steering feel for the vehicle operator simultaneously. Steering wheel force feedback system 12 includes steering wheel fault detection unit 16 and steering wheel controller 38 in communication with steering wheel fault detection unit 16. System 12 further includes a steering wheel 30, a motor actuator 32 and its amplifier 33 in communication with controller 38, an actuator mechanism 34 to connect the actuator and steering wheel and a sensor 35 measuring steering wheel angle. The steering wheel force feedback controller 38 provides the control of the steering feel and other steering functions. The steering wheel controller 38 and road wheel controller 26 are integrated to implement steer-by-wire functions.

Model-based fault detection unit 13 uses analytical redundancy in the steer-by-wire system 10. As mentioned, unit 13 includes the steering wheel system fault detection unit (SW FDU) 16 and road wheel control system fault detection unit (RW FDU) 15. The model-based steering wheel system fault detection unit 16 receives the sensed steering wheel angle signal, control command signal from steering wheel controller or the current signal from road wheel actuator amplifier and vehicle speed signal. Fault detection unit 16 provides the information to determine fault occurrence in steering wheel angle sensor, steering wheel actuator and steering wheel controlled plant. The model-based road wheel system fault detection unit 15 receives the sensed road wheel angles, control command signal from the road wheel controller 26 or the current signal from road wheel actuator amplifier 22, and vehicle speed. This fault detection unit 15 provides the information to determine any fault occurrence in road wheel angle sensors 23, road wheel actuators 20 and the road wheel controlled plant. In this embodiment, the fault diagnosis units are implemented using an embedded system with software programming.

Figure 2:
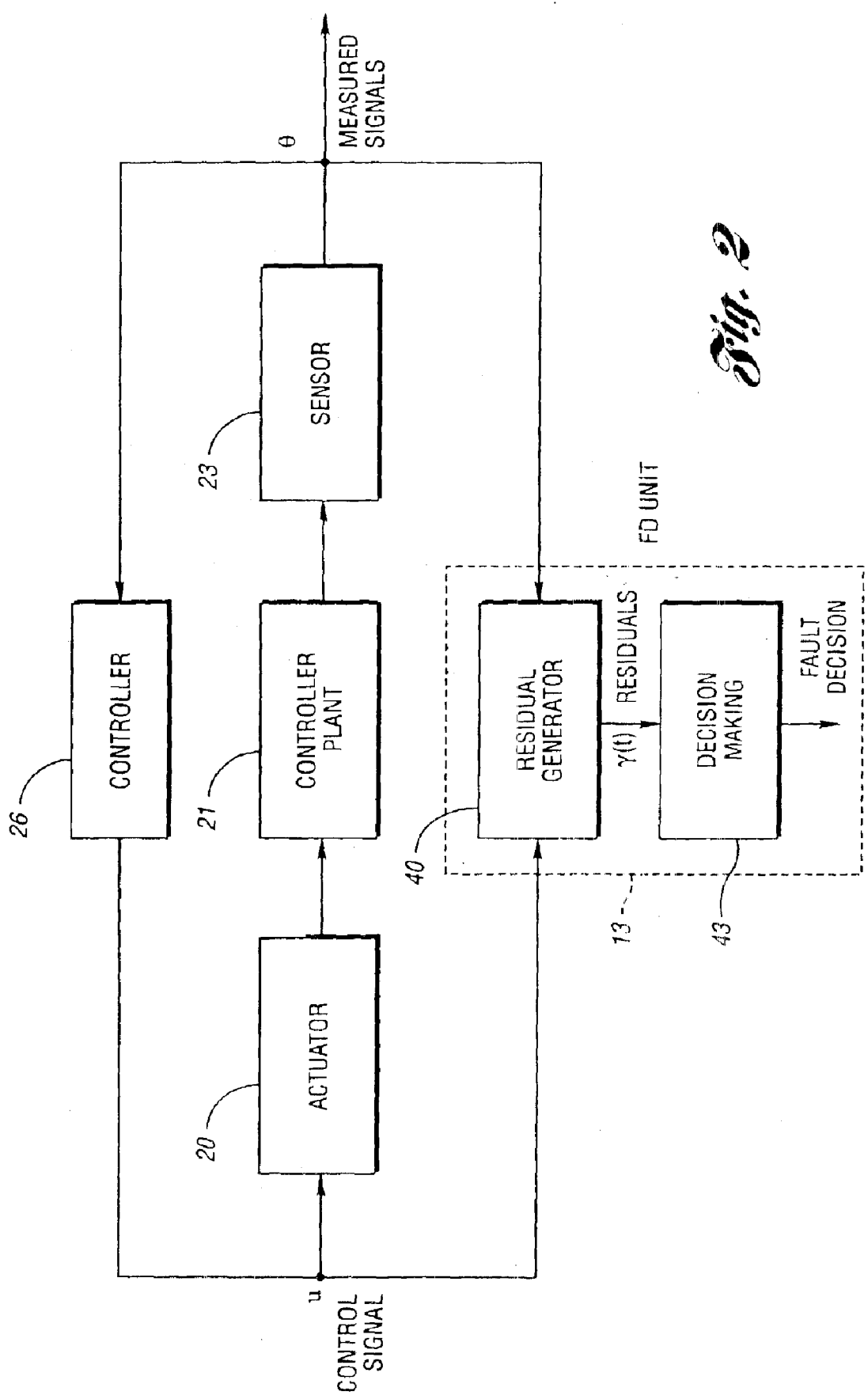
FIG. 2 is a block diagram of the model-based steer-by-wire system fault detection unit shown in FIG. 1.

FIG. 2 illustrates a block diagram of the basic structure for the steer-by-wire system fault diagnosis unit 13 for either the road wheel actuation system FDU 15 or the steering wheel force feedback system FDU 16. The inputs of the FDU 13 include the control signals u(t), actuator current signals i(t) (not show), sensed road wheel angle or steering wheel angle signals θ(t), and vehicle dynamic signals such as vehicle speed v(t) (not show). The output of the FDU 13 is the residual signal γ(t). As shown, the FDU 13 is comprised of two main stages: residual generation and decision making.

In the residual generation stage, outputs and inputs of the steer-by-wire control system are processed by a predetermined algorithm to generate a vector residual signal. The residual signals represent the difference between various functions of the observed sensor outputs and the expected values of these functions in the normal (no-fault) mode. In this embodiment, the residuals are non-zero when a fault occurs and near zero with no fault. Thus, residual generation is based on knowledge of the normal behavior of the steer-by-wire control system. The system to generate the residual is called a residual generator 40.

In the decision-making stage, the residuals are examined for the likelihood of faults, and a decision rule is then applied to determine if any faults have occurred. A decision process may include a threshold test on the instantaneous values or moving averages of the residuals, or it may include methods of statistical decision theory.

The residual signal γ(t) generated by the model-based analytical redundancy methods normally takes the following form:

$$\gamma(t) = \gamma(f, d, \Delta, v) \qquad (1)$$

where f is a class of faults, d is the external noise signal, Δ is the steer-by-wire system model uncertainty and v is the dependent variable resulting in gain changes of the vehicle dynamics. Thus, the residual signal γ(t), which represents the fault occurrence, is related with the external noise signals, system model uncertainty and gain changes of the vehicle dynamics.

With residual signal $\gamma(t)$ in (1), the fault detection problem can be described by $$\gamma(t)<\lambda(d, \Delta, v); \text{ no fault occurs}, f=0. \quad (2)$$

$$\gamma(t)\geq\lambda(d, \Delta, v); \text{ fault occurs}, f\neq 0. \quad (3)$$

where $\lambda(d, \Delta, v)$ is a threshold depending on the external noise d, the model uncertainty $\Delta$ and the dependent variable v resulting in gain changes of the plant dynamics.

An effective and reliable fault detection method for generating a residual signal $\gamma(t)$ is desired to be robust with respect to the model uncertainty, external noise and gain change of the controlled plant, and is sensitive to faults. This invention describes a robust fault detection strategy using the proposed robust gain scheduling $H^\infty$ fault detector as a residual signal generator to satisfy such requirement.

The following state-space equations gives the description for the controlled road wheel actuation system or controlled steering wheel force feedback system of the steer-by-wire system without faults:

$$\dot{x}=(A(v)+\Delta A(v))x+(B_1(v)+\Delta B_1(v))d+B_2(v)u \quad (4a)$$

$$y=(C_2(v)+\Delta C_2(v))x+(D_{21}(v)+\Delta D_{21}(v))d \quad (4b)$$

$$z=C_1(v)x \quad (4c)$$

where $x\in R^n$ is the State variable, $y\in R^p$ is the measured output, $z\in R^q$ is a linear combination of the state variables to be detected, $d\in R^m$ is the disturbance, u is the control input, $A(v)$, $B_1(v)$, $C_1(v)$, $C_2(v)$, and $D_{21}(v)$ are matrices of the appropriate dimensions that describe the nominal system, $\Delta A(v)$, $\Delta B_1(v)$, $\Delta C_2(v)$ and $\Delta D_{21}(v)$ represent the parameter uncertainties, and v represents vehicle speed. As is known in the art, the equation $x\in R^n$ means that x is an element in the set of $R^n$. It is a description for the steer-by-wire system with non-linearity and uncertainty. The equation is linear at each nominal vehicle speed, $v=v_0$.

Equation (4) describes the dynamic characteristics of the road wheel actuation system or steering wheel force feedback system under the influence of external noise, system model uncertainty and the vehicle dynamic variable. It is a nominal controlled system model in the form of state space description with no faults. When the faults occur, the model will change to describe the controlled system with fault. The model change with the occurrence of a fault, fault mode description, will be described later. This invention describes a robust fault detection strategy using the proposed robust gain scheduling $H^\infty$ fault detector as a residual signal generator to satisfy such requirement.

To detect the fault, a robust gain scheduling $H^\infty$ fault detector is implemented as a residual generator to generate residual signal. The $H^\infty$ fault detector is implemented based on $H^\infty$ estimation strategy. For the nonlinear uncertain steer-by-wire system described in (4), it is desired to find an internally stable residual generator which will produce the best estimation $\hat{z}$ of z based on the measured output y and control command signal u, $\hat{z}=C_1(v)\hat{x}$, such that for any given $\gamma>0$ $$\underset{\|d\|_2\leq 1}{\text{Max}}\|e\|_2 < \gamma \quad (5)$$

where $\|\ \|$ represents the norm, and e is the estimation error between the detected variable z and its estimation $\hat{z}$:

$$e=z-\hat{z}=C_1(v)x-\hat{z} \quad (6)$$

Equation (5) is a $H^\infty$ norm criterion. If this criterion is satisfied, the estimation error will be less than a desired value and the estimated variable value will be close to the actual variable value.

The resultant robust gain scheduling $H^\infty$ fault detector to generate residual signals is given by $$\dot{\hat{x}}=A(v)\hat{x}+B_2(v)u+F(v)(y-C_2(v)\hat{x}) \quad (7a)$$

$$\hat{z}=C_1(v)\hat{x} \quad (7b)$$

The gain $F(v)$ may be scheduled as a function of vehicle speed. $F(v)$ can be obtained by solving a Riccati equation as known under each nominal operating condition $v=v_0$. To provide additional background information on the state estimation using $H^\infty$ estimation strategy, a paper titled "A Robust $H^\infty$ Estimator Design Method for Linear Uncertainty System", Proceedings of the 1994 American control conference, Jun. 29–Jul. 1, 1994, by Yao Y. X, M. Darouach and J. Schaefers, is incorporated herein by reference.

Based on (7), the general residual signal of robust gain scheduling $H^\infty$ fault detector is expressed by:

$$\gamma=z-\hat{z}=z-C_1(v)\hat{x} \quad (8)$$

This residual signal of the fault generator is the difference between the output signal $\hat{z}=C_1(v)\hat{x}$ of the robust gain scheduling $H^\infty$ fault detector and the real measurement signal z. Since the nonlinearity and uncertainty characteristics have been considered in the design process of the robust gain scheduling $H^\infty$ fault detector, the resultant residual is robust with respect to the model uncertainty, external noise and dynamic gain change, and is sensitive to faults occurrence in the controlled system, sensors, and actuators. When a fault occurs in the actual steer-by-wire system, the state-space model (4) describing the actual steer-by-wire system will change. On the other hand, the model of the robust gain scheduling $H^\infty$ fault detector based on the nominal system with no fault will not be changed. Thus, the residual signal of the robust gain scheduling $H^\infty$ fault detector (7) and (8) will change because the actual variable z changes. When the residual signal value exceeds a threshold, the fault information will be given.

Faults may occur in the sensors of road wheel angle and steering wheel angle, actuators of the road wheel actuation system and steering wheel force feedback system, or the controlled steering wheel force feedback system and road wheel actuation system themselves. The above-mentioned robust gain scheduling $H^\infty$ fault detector can be used to detect such faults. The following gives further description of how to determine these faults using the robust gain scheduling $H^\infty$ fault detector (7) and (8) based on controlled system model (4) in the presence of a fault occurred in sensors, actuators, and controlled systems themselves.

For sensor fault, assume that a sensor fault occurred in the system represented by (4). The fault is modeled by an additional term added to (4):

$$\dot{x}=(A(v)+\Delta A(v))x+(B_1(v)+\Delta B_1(v))d+B_2(v)u \quad (9a)$$

$$y=(C_2(v)+\Delta C_2(v))x+(D_{21}(v)+\Delta D_{21}(v))d+f_s \quad (9b)$$

where $f_s$ is a sensor fault event vector. In the absence of a fault, $f_s$ is equal to zero.

In the actual steer-by-wire control system, faults occurrence in the steering wheel angle sensor or road wheel angle sensor will cause a false control action for the steering wheel or road wheel control system. The false control action will cause further undesired changes in the dynamics of the controlled system (4). The state-space equation (9) gives the general description for the sensor faults such as sensor lock, sensor constant gain linear change, and sensor constant gain bias.

The detected variable in (8) becomes y to replace z. The state variable estimation for variable z becomes an output variable estimation for output variable in (4). Define the residual signal (without faults) as $$\gamma = y - \hat{y} \tag{10}$$

then when a fault occurs $$\gamma = y - \hat{y} + f_s \tag{11}$$

The residual signal γ in (10) is near zero without a fault when the sensor fault vector $f_s$ in (9b) is equal to zero. When a fault occurs and $f_s$ in (9b) is non-zero, the residual signal γ will include an effect of the sensor fault $f_s$.

For actuator fault, assume that an actuator fault occurred in the system represented by (4). The fault can be modeled by an additional term added to (4):

$$\dot{x} = (A(v) + \Delta A(v))x + (B_1(v) + \Delta B_1(v))d + B_2(v)u + f_i \tag{12a}$$

$$y(C_2(v) + \Delta C_2(v))x + (D_{21}(v) + \Delta D_{21}(v))d \tag{12b}$$

where $f_i$ is an actuator fault event vector. In the absence of a fault, $f_i$ is equal to zero.

In the actual steer-by-wire control system, fault occurrence in the actuator of the steering wheel system or road wheel system will affect dynamics of the controlled system in (4). The state-space equation (12) gives the general description for actuator faults such as actuator lock, actuator constant gain linear change, and actuator constant gain bias.

Define the residual signal (without faults) in (8) as $$\gamma = (z - \hat{z}) \tag{13}$$

then when a fault occurs $$\gamma = z - \hat{z} + \hat{z}_i \tag{14}$$

where $\hat{z}_i$ is the effect of an actuator fault event vector $f_i$. The residual signal γ in (14) is close to zero without fault when the actuator fault vector $f_i$ in (12a) is equal to zero. When a fault occurs and $f_i$ in (12a) is not equal to zero, the residual signal γ will include an effect from the fault $f_i$.

For system fault, assume the occurrence of the ith state in the system represented by (4). The fault can be modeled as:

$$\dot{x} = (A(v) + \Delta A(v))(x + \Delta f_i) + (B_1(v) + \Delta B_1(v))d + B_2(v)u \tag{15a}$$

$$= (A(v) + \Delta A(v))x + (B_1(v) + \Delta B_1(v))d +$$

$$B_2(v)u + (A(v) + \Delta A(v))\Delta f_i$$

$$y = (C_2(v) + \Delta C_2(v))x + (D_{21}(v) + \Delta D_{21}(v))d \tag{15b}$$

where $\Delta f_i$ is ith state fault event vector. In the absence of a fault, $\Delta f_i$ is equal to zero.

In the actual steer-by-wire control system, fault occurrence in the controlled steering wheel system and controlled road wheel system will affect dynamics of the controlled system in (4). The state-space equation (15) gives the general description for controlled system faults.

Define the residual signal (without faults) as $$\gamma = (z - \hat{z}) \tag{16}$$

then when a fault occurs $$\gamma = z - \hat{z} + \hat{z}_s \tag{17}$$

where $z_s$ is the effect of the controlled system fault event vector $\Delta f_i$. The residual signal γ in (17) is close to zero without a fault when the state fault vector $\Delta f_i$ in (15a) is equal to zero. When a fault occurs and $\Delta f_i$ in (15a) is not equal to zero, the residual signal γ will include an effect of the fault $\Delta f_i$.

In one embodiment, the residual γ includes the effects of model uncertainties, system dynamic gain changes, noise and faults. These effects have been considered in the design of the robust gain scheduling $H^\infty$ fault detector to generate residual signal. As a result, sensor fault vector $f_s$, actuator fault vector $f_i$ and the controlled system fault vector $\Delta f_i$ will be dominant in the residual signal. Thus, the actual fault can be detected under the influence of the effects of model uncertainties, noise and system dynamic gain change.

Figure 3:
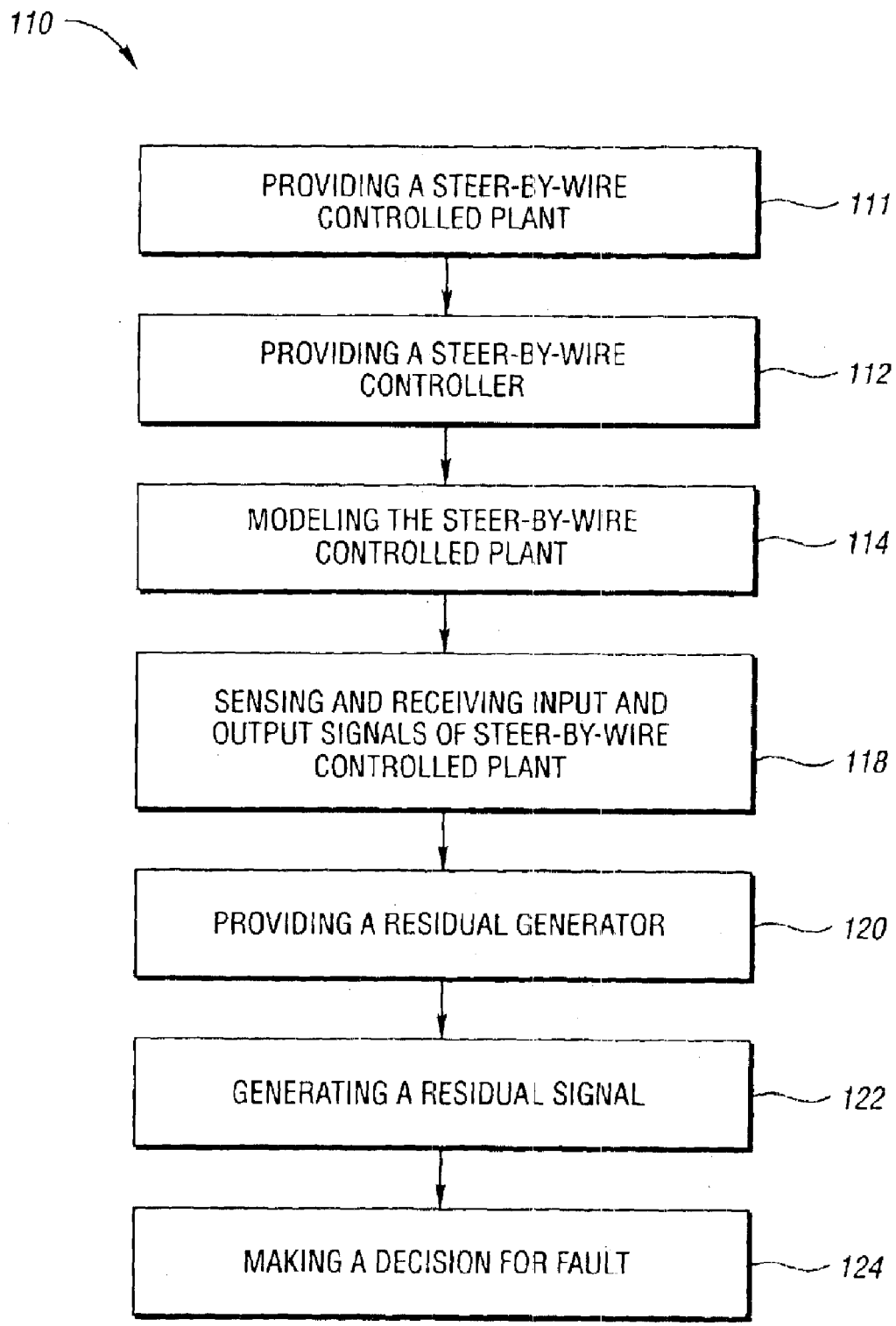
FIG. 3 is a flow chart of one method of fault detection for the steer-by-wire system in FIG. 1.

FIG. 3 is a flow chart depicting one method 110 of fault detection for the vehicle steer-by-wire system mentioned above. The method 110 provides a model-based fault detection method according to analytical redundancy technology to detect faults occurrence in sensors, actuators, and other electro-mechanical components in the steer-by-wire controlled plant. As shown, method 110 includes providing a steer-by-wire controlled plant with wheel angle measured output in box 111. Method 110 further includes steer-by-wire controller for generating a road wheel control command signal and a steering wheel control command signal in box 112. The steer-by-wire controlled plant may be a road wheel actuation system or a steering wheel force feedback system. The steer-by-wire controller may be a controller in a road wheel actuation system or a controller in a steering wheel force feedback system.

Method 110 further includes modeling the steer-by-wire controlled plant under the influence of uncertainty, disturbance and vehicle speed in box 114 as $$\dot{x} = (A(v) + \Delta A(v))x + (B_1(v) + \Delta B_1(v))d + B_2(v)u$$

$$y = (C_2(v) + \Delta C_2(v))x + (D_{21}(v) + \Delta D_{21}(v))d$$

$$z = C_1(v)x,$$

where $x \in R^n$ is a state variable, $y \in R^p$ is a measured output, $z \in R^q$ is a linear combination of state variables to be detected, $d \in R^m$ is a disturbance, u is a control input, $A(v)$, $B_1(v)$, $C_1(v)$, $C_2(v)$, $D_{12}(v)$ and $D_{21}(v)$ are matrices of dimensions to describe a nominal system, $\Delta A(v)$, $\Delta B_1(v)$, $\Delta C_2(v)$ and $\Delta D_{21}(v)$ represent parameter uncertainties, and v represents vehicle speed.

As shown, method 110 further includes providing a fault detection unit in electrical communication with the controller. The fault detection unit is implemented by using the model-based fault detection technology to implement a consistency check between the model variables and observed variables of the actual steer-by-wire system to infer any faults which may occur and components which fail during such fault. To implement this task, the output signals and input signals of steer-by-wire controlled plant are sensed and received by the fault detection unit in box 116. These signals include road wheel angles, steering wheel angle signals, controller command signals, vehicle speed signal and possible other vehicle signals.

Based on the input and output signals, the fault detection unit is implemented by using a model-based residual signal generator in box 120 to derive a series residual signal in box 122. Signals are processed by the residual generator based on knowledge of the normal behavior of the system to generate residual signals. Residual signals are examined for the likelihood of faults, and a decision rule is then applied to determine if any faults have occurred in box 124. Fault is determined if the residual signal exceeds a given threshold when faults occur in the sensor, actuator, and controlled steer-by-wire system.

The box 120 in method 110 may be a robust gain scheduling $H^\infty$ fault detector to generate residual signals as follows:

$$\dot{\hat{x}}=A(v)\hat{x}+B_2(v)u+F(v)(y-C_2(v)\hat{x})$$

$$\hat{z}=C_1(v)\hat{x},$$

where gain of $F(v)$ is scheduled as a function of vehicle speed and $\hat{z}=C_1(v)\hat{x}$ is an estimation of the linear combination z of state variables to be detected.

Furthermore, the box 120 in method 110 includes generating a residual signal being expressed by:

$$\gamma=z-\hat{z}=(z-C_1(v)\hat{x}),$$

wherein the residual signal is the difference between the estimation of the linear combination of the estimator-based residual generator $\hat{z}=C_1(v)\hat{x}$ and the real measurement signal z in box 122.

Furthermore, the robust gain scheduling $H^\infty$ fault detector in method 110 detects the faults occurred in the sensor, actuator, and controlled steer-by-wire controlled plant. This invention gives the description of fault detection using the faulted system models and generated residual signals from the robust gain scheduling $H^\infty$ fault detector.

In one embodiment, the sensor fault is described in the steer-by-wire controlled plant model as follows:

$$\dot{x}=(A(v)+\Delta A(v))x+(B_1(v)+\Delta B_1(v))d+B_2(v)u$$

$$y=(C_2(v)+\Delta C_2(v))x+(D_{21}(v)+\Delta D_{21}(v))d+f_s$$

where $f_s$ is a sensor fault event vector. In the absence of a fault, $f_s$ is equal to zero.

The residual signal is expressed by $$\gamma=y-\hat{y}+f_s$$

wherein the residual signal is the difference between the estimation of the measured output of the robust gain scheduling $H^\infty$ fault detector and the real measurement of the measured output.

In another embodiment, the actuator fault is described in the steer-by-wire controlled plant model as follows:

$$\dot{x}=(A(v)+\Delta A(v))x+(B_1(v)+\Delta B_1(v))d+B_2(v)u+f_i$$

$$y=(C_2(v)+\Delta C_2(v))x+(D_{21}(v)+\Delta D_{21}(v))d$$

where $f_i$ is an actuator fault event vector. In the absence of a fault, $f_i$ is equal to zero.

The residual signal is expressed by:

$$\gamma=z-\hat{z}+\hat{z}_i$$

where $\hat{z}_i$ is the effect of an actuator fault event vector $f_i$.

In another embodiment, the controlled system fault is described in the steer-by-wire controlled plant model as follows:

$$\dot{x}=(A(v)+\Delta A(v))(x+\Delta f_i)+(B_1(v)+\Delta B_1(v))d+B_2(v)u$$

$$=(A(v)+\Delta A(v))x+(B_1(v)+\Delta B_1(v))d+B_2(v)u+(A(v)+\Delta A(v))\Delta f_i$$

$$y=(C_2(v)+\Delta C_2(v))x+(D_{21}(v)+\Delta D_{21}(v))d$$

where $\Delta f_i$ is ith state fault event vector.

The residual signal is expressed by:

$$\gamma=z-\hat{z}+\hat{z}_s$$

where $z_s$ is the effect of the controlled system fault event vector $\Delta f_i$.

In one embodiment, residual signals are examined for the likelihood of faults and fault is determined if the residual signal exceeds a given threshold when the fault occurs in the sensor, actuator, and controlled steer-by-wire system. The residual signal $\gamma$ is near zero without a fault when the fault vector $f_s$, actuator fault event vector $f_i$, and controlled system fault event vector $\Delta f_i$ are equal to zero. When a fault occurs and above-mentioned fault vectors are non-zero, the residual signal $\gamma$ will include an effect of fault.

While the present invention has been described in terms of preferred embodiments, it will be understood, of course, that the invention is not limited thereto since modifications may be made to those skilled in the art, particularly in light of the foregoing teachings.

We claim:

1. A method of model-based fault detection for a vehicle steer-by-wire system, the method comprising:
   providing a steer-by-wire controlled plant with electric motor actuators, sensors, and other electrical and mechanical components and assembly
   providing a steer-by-wire controller for the steer-by-wire controlled plant to implement a steer-by-wire closed-loop system control;
   providing a steer-by-wire fault detection unit in electrical communication with steer-by-wire controlled plant and the steer-by-wire controller to detect faults of the steer-by-wire controlled plant;
   receiving input and output signals from the steer-by-wire controlled plant and vehicle signals from the vehicle;
   providing a residual generator in the steer-by-wire fault detection unit based on a mathematical model of steer-by-wire controlled plant without any fault in the controlled plant to implement an estimation for input signals, output signals, and states of the steer-by-wire controlled plant;
   generating a series of residual signals from a residual generator representing the difference between the received measurement signals from the steer-by-wire controlled plant and the estimated signals from residual generator;
   providing a decision-making unit in the steer-by-wire fault detection unit based on the received residual signals from the residual generator and fault test rules; and
   generating a fault decision signal to determine the fault occurrence in sensors, actuators, and the steer-by-wire controlled plant with other electro-mechanical components.

2. The method of claim 1 wherein the stage of detecting faults of the steer-by-wire controlled plant includes:
   generating residual signals; and
   making decision to determine whether any faults have occurred by applying a fault test rule for residual signals.

3. The method of claim 1 wherein the steer-by-wire controlled plant receives control command signals from the steer-by-wire controller and generates wheel angle measurement signals, and wherein the steer-by-wire controller generates the control command signals which are received by the steer-by-wire control plant as the input command signals.

4. The method of claim 1 wherein the model-based fault detection applies a mathematical model of the steer-by-wire controlled plant to implement a consistency check between model variables and estimated variables of the actual steer-by-wire system to infer if fault occurs and which components fail.

5. The method of claim 4 wherein a robust mode-based fault detection is implemented for a steer-by-wire system under the influence of system uncertainty and nonlinearity of the steer-by-wire controlled plant.

6. The method of claim 5 wherein the uncertainty and nonlinearity of the steer-by-wire controlled plant includes dynamics change with road conditions, vehicle loads, road-tire friction, electric motor-based actuator and assembly dynamics, vehicle dynamics and external circumstances, and modeling errors of the mathematical model of the steer-by-wire controlled plant.

7. The method of claim 4 wherein the steer-by-wire controlled plant without faults under the influence of system uncertainty and nonlinearity is modeled as $$\dot{x}=(A(v)+\Delta A(v))x+(B_1(v)+\Delta B_1(v))d+B_2(v)u$$

$$y=(C_2(v)+\Delta C_2(v))x+(D_{21}(v)+\Delta D_{21}(v))d$$

$$z=C_1(v)x,$$

where $x \in R^n$ is a state variable, $y \in R^p$ is a measured output, $z \in R^q$ is a linear combination of state variables to be detected, $d \in R^m$ is a disturbance, u, is a control input, $A(v)$, $B_1(v)$, $B_2(v)$, $C_1(v)$, $C_2(v)$, and $D_{21}(v)$ are matrices of dimensions to describe a nominal system, $\Delta A(v)$, $\Delta B_1(v)$, $\Delta C_2(v)$ and $\Delta D_{21}(v)$ represent parameter uncertainties, and v represents vehicle speed.

8. The method of claim 4 wherein a robust fault detection method using the robust gain scheduling $H^\infty$ fault detector is implemented based on the mathematical model of steer-by-wire controlled plant under the influence of system uncertainty and nonlinearity to derive a series residual signal.

9. The method of claim 8 wherein the robust gain scheduling $H^\infty$ fault detector is given by $$\dot{\hat{x}}=A(v)\hat{x}+B_2(v)u+F(v)(y-C_2(v)\hat{x})$$

$$\hat{z}=C_1(v)\hat{x},$$

where gain of $F(v)$ is scheduled as a function of vehicle speed and $\hat{z}=C_1(v)\hat{x}$ is an estimation of the linear combination of state variables to be detected.

10. The method of claim 1 wherein the residual signal of residual generator based on the robust gain scheduling $H^\infty$ fault detector is expressed by:

$$\gamma = z - \hat{z},$$

wherein the residual signal is the difference between the output signal $\hat{z}$ of the robust gain scheduling $H^\infty$ fault detector based on the estimation for the variable z and the real measurement signal z.

11. The method of claim 10 wherein the residual is robust with respect to the model uncertainty, external noise and dynamic gain change, and is sensitive to faults occurrence in the steer-by-wire controlled plant.

12. The method of claim 1 wherein a decision-making unit receives residual signal $\gamma$ from the residual generator, and generates a fault decision signal to determine the fault occurrence in the steer-by-wire controlled plant by applying the fault test rules.

13. The method of claim 12 wherein the decision process may include a threshold test on the instantaneous values or moving averages of the residuals expressed by:

$$\gamma(t) < \lambda(d, \Delta, v); \text{ no fault occurs, } f=0$$

$$\gamma(t) \geq \lambda(d, \Delta, v); \text{ fault occurs, } f \neq 0.$$

where $\lambda(d, \Delta, v)$ is a threshold depending on the external noise d, the model uncertainty $\Delta$ and the dependent variable v resulting in gain changes of the steer-by-wire controlled plant dynamics, and f represents a fault.

14. The method of claim 1 wherein the faulted steer-by-wire controlled plant models are described for faults occurred in the sensor, actuator, and steer-by-wire controlled plant itself and residual signals are generated from the residual generator based on the robust gain scheduling $H^\infty$ fault detector.

15. The method of claim 1 wherein the fault detection unit receives output signals and input signals of steer-by-wire controlled plant including road wheel angles, steering wheel angle, controller command signals, vehicle speed signal and possible other vehicle signals.

16. The method of claim 1 wherein the fault detection unit is a steering wheel force feedback fault detection unit for detecting faults occurred in the steering wheel force feedback controlled plant including sensors, actuators and the controlled plant itself.

17. The method of claim 1 wherein the fault detection unit is a road wheel actuation fault detection unit for detecting faults occurred in the road wheel actuation controlled plant including sensors, actuators and the controlled plant itself.

18. The method of claim 1 wherein a series of residuals may be generated where each residual indicates a different fault to achieve fault isolation.

19. A system of model-based fault detection for a vehicle steer-by-wire system, the system comprising:
a steer-by-wire controlled plant with electric motor actuators, sensors, and other electrical and mechanical components and assembly;
a steer-by-wire controller for the steer-by-wire controlled plant to implement a steer-by-wire system feedback control;
a steer-by-wire fault detection unit in electrical communication with the steer-by-wire controlled plant and the steer-by-wire controller to detect faults of the steer-by-wire controlled plant, the fault detection unit being configured to receive input and output signals from the steer-by-wire controlled plant and vehicle signals from the vehicle;
a residual signal generator in the steer-by-wire fault detection unit based on a mathematical model of steer-by-wire controlled plant without any fault in the controlled plant; and
a decision-making unit in the steer-by-wire fault detection unit to examine residuals and to determine if any faults have occurred according to the a fault decision rule.

20. The system of claim 19 wherein the fault detection unit receives output signals and input signals of steer-by-wire controlled plant including road wheel angles, steering wheel angle, controller command signals, vehicle speed signal and possible other vehicle signals.

21. The system of claim 19 wherein the fault detection unit generates fault decision signals for detecting faults in the steer-by-wire system including sensors, actuators and the steer-by-wire controlled plant itself.

* * * * *